United States Patent [19]
Gasior

[11] 3,754,469
[45] Aug. 28, 1973

[54] ALL PURPOSE FLAVOR FOR POULTRY AND MEATS

[76] Inventor: Bernard Gasior, 3434 E. Grange Ave., Cudahy, Wis. 53110

[22] Filed: Sept. 27, 1971

[21] Appl. No.: 183,820

[52] U.S. Cl. .................................. 99/532, 99/494
[51] Int. Cl. ..... A23b 1/16, A47j 43/00, A22c 17/00
[58] Field of Search .................. 99/257, 256, 532, 99/533, 494; 128/231, 232, 233

[56] References Cited
UNITED STATES PATENTS

| | | | |
|---|---|---|---|
| 1,192,596 | 7/1916 | Albrecht | 99/257 |
| 2,290,363 | 7/1942 | Stirton | 99/256 UX |
| 2,556,994 | 6/1951 | Candolini et al. | 99/256 UX |
| 2,837,251 | 6/1958 | Moir et al. | 128/232 UX |
| 3,410,457 | 11/1968 | Brown | 99/257 X |
| 3,483,810 | 12/1969 | Peters et al. | 99/257 |
| 3,590,722 | 7/1971 | Leptrone | 99/257 |

FOREIGN PATENTS OR APPLICATIONS 101,817   11/1925   Austria ............................. 128/231

Primary Examiner—Wayne A. Morse, Jr.
Assistant Examiner—Arthur O. Henderson

[57] ABSTRACT

An injection syringe for injecting a prepared flavoring into poultry or meat prior to a cooking operation, the device comprising a cylinder containing a slideable piston, the piston being attached to one end of a piston rod extending outward of one end of the cylinder, the outer end of the piston rod having a convenient handle for purpose of being depressed, and the opposite end of the cylinder having a hollow needle secured there to for insertion into the poultry or meat interior.

1 Claim, 3 Drawing Figures

PATENTED AUG 28 1973 3,754,469

INVENTOR.
BERNARD GASIOR

ALL PURPOSE FLAVOR FOR POULTRY AND MEATS

This invention relates generally to injection syringes. More specifically the present invention relates to cooking implements.

It is generally well known that a food prepared together with flavoring has a superior taste than a like food having no flavor added thereto prior to the cooking operation.

Accordingly it is a principal object of the present invention to provide an injection syringe designed particularly for the purpose of injecting prepared flavoring into poultry or meats prior to their cooking so that they will have an improved taste.

Another object of the present invention is to provide an all purpose flavor injector for poultry and meats and which is designed particularly for kitchen use so that a home maker can conveniently use the same in implanting prepared flavoring into any type of poultry such as chicken, turkey or the like and have fresh meats or cured meats such as ham or the like.

Another object of the present invention is to provide an all purpose flavor injector for poultry and meats which is simple in design, inexpensive to manufacture, rugged in construction, easy to use and efficient in operation.

Figure 1:
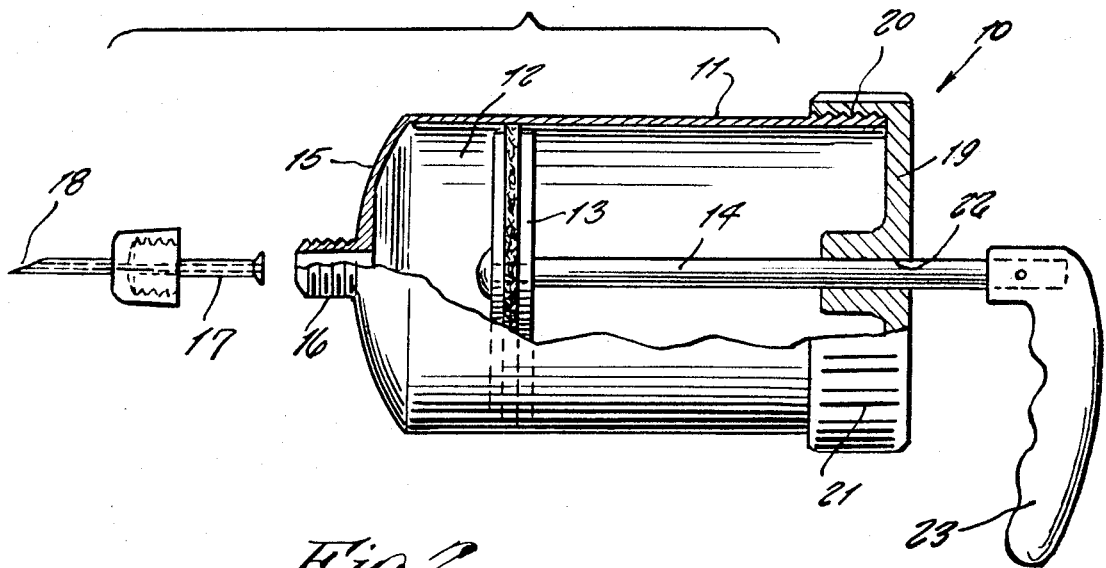
Figure 2:
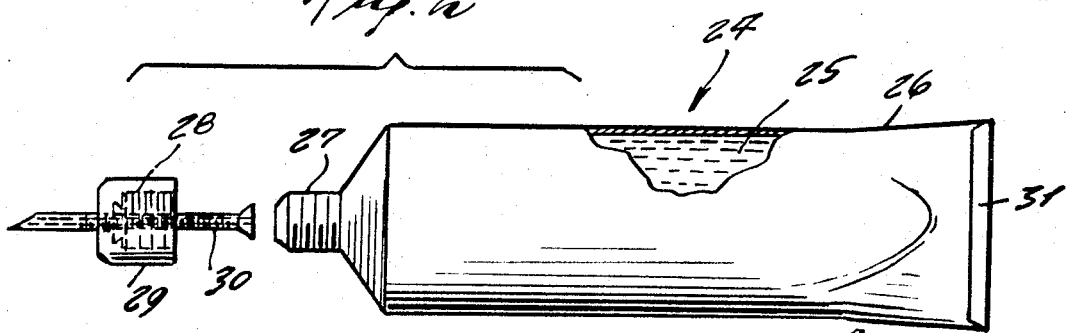
Figure 3:
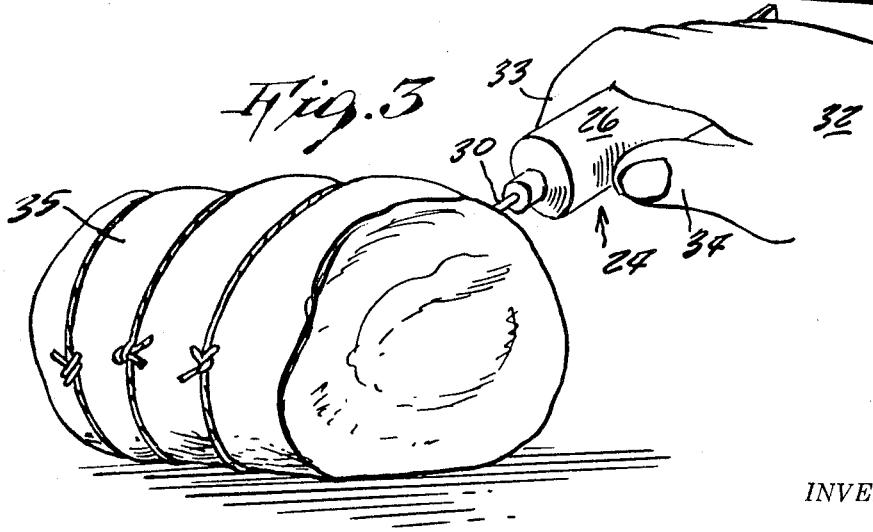

These and other objects will be readily evident upon a study of the following specification and the accompanying drawing wherein:

FIG. 1 is a side elevation view showing one form of the present invention and shown partly cross section, FIG. 2 is a side elevation view of a slightly modified design thereof and wherein the slideable piston of the structure illustrated in FIG. 1 is substituted by means of compressable opposite side walls of a squeezed type tube, and FIG. 3 is a perspective view of the present invention shown in operative use injecting a flavoring into a meat roast.

Referring now to the drawing in detail, and more particularly to FIG. 1 at this time, the reference numeral 10 represents an all purpose injector for flavoring, according to the present invention, wherein there is a cylinder 11 having a hollow interior 12 and within which there is contained a slideable piston 13 secured to one end of a piston rod 14. An end wall 15 at one end of the cylinder 11 has an extending externally threaded end 16 upon which may be secured a removable hollow needle 17 having a forward end that terminates in a point 18 so that the same may be conveniently injected into poultry or meat.

A removable end cap 19 is either frictionally fitted or screw threaded as shown at 20 upon the opposite end of the cylinder 11 and provides a means for gaining to the interior 12 so to permit the loading of the forward end of the cylinder with a flavoring to be injected into the poultry or meat.

The removable end cap 19 is provided with a knurl or other extended design 21 upon its outer side so that the same may be conveniently grasped within a person's hand and permitted to be rotated during assembly or disassembly from the cylinder. The end cap 19 is provided with a central opening 22 therethrough and through which the piston rod 14 extends, the outer end of the piston rod 14 being secured to a convenient grasp handle 23.

In operative use, the piston assembly including the piston, piston rod and end cap are removable from the cylinder after which a suitable flavoring is placed within the interior 12. There after the piston assembly is reinstalled and the needle 17 is fitted upon the forward end of the cylinder. The forward end of the needle is inserted into the poultry or meat and the handle 23 is pushed so as to urge the piston 13 against the flavoring and forcing the same out of the needle 17 and into the meat or poultry.

In FIG. 2 of the drawing, there is shown a modified design of all purpose flavor injector 24 of a more simple design and which accordingly couldn't be made to be retailed with a specific flavoring already contained therewithin. It is of course understood that the structure shown in FIG. 1 is of course refillable so that a housewife may refill the same with any other flavoring recipe so it could be used for other type of meat or poultry. In the structure shown in FIG. 2, the flavor injector 24 accordingly eliminates the necessity of the above described piston assembly and accordingly is relatively of such low cost that the device can be readily discarded after the flavoring 25 contained therewithin is used up.

The all purpose flavor injector 24 comprises a cylinder or tube 26 made preferably of compressable plastic material so that it can be squeezed with a person's hand, as shown in FIG. 3. Such plastic material will of course not defect the flavoring contained therewithin and is therefore particularly suitable for the present purpose.

At the end of the tube 26 there is a nipple 27 externally threaded so as to threadingly engage the internal thread 28 of the cup 29 integrally formed around the outer side of the hollow needle 30. The opposite end of the tube 26 is sealed as shown at 31 after the flavoring 25 has been commercially filled into the tube.

In use, as shown in FIG. 1, the flavor injector 26 is held within the hand 32 and fingers 33 and 34 are placed upon opposite sides of the tube 26 so as to squeeze the same, thus forcing the flavor 25 to be forced outward of the needle 30 and into the roast or meat 35.

It is of course understood that various flavoring may be prepared for specific meats and the flavor injectors may be accordingly labeled so that when retailed, the customer can quickly select the particular prepared flavor for her particular type of meat. Such flavors may comprise prepared flavoring including butter, spices, garlic, pepper or various other ingredients so that the ordinary cook can prepare a delectable meat.

In a modified design of the invention, as shown in FIG. 2 of the drawing, the needle 30 may be made not integral with the cup 29 but may be made as separate members which are screw threaded together so to assume the position as illustrated in FIG. 2. In this form of the invention, the needle accordingly could be originally retailed not threadingly engaged to the cup 29 as shown but could be removed therefrom and the conically enlarged head on one end of the needle being fitted into a corresponding conical notch within the interior of the cup 29 so that the pointed end of the needle protrudes into the interior of the tube 26 and thus be retailed in a sanitary condition. In such case a thin plastic membrane could be fitted and integrally formed blocking the opening through which the needle is afterwards threaded so to assume the position as shown in FIG. 2. Thus the flavoring would not be able to leak out of the tube. To install the needle to the cup, the person would simply remove the cup 29 from the threaded end 27 of the tube 26, then pull the needle 30 loose from the cup 29 so that the conical head on the end of the needle snaps out of the conical opening within the end of the cup 29 shown. The person then simply inserts the pointed end of the needle into the threaded opening and screws the same in, the pointed end of the needle thus piercing the thin membrance blocking the passage, and the needle is inserted sufficiently threadingly in the cup 29 to assume the position shown in the drawing. Thereafter the device is assemblied to the tube.

What I now claim is:

1. In an all purpose injector for poultry or meat, the combination of a container for containing a prepared flavoring for enhancing the flavor of poultry or meat, one end of said container having a removable end cap, said container comprising a squeezable tube of depressable plastic material, an opposite end of said container being sealed, said end of said container being externally threaded and engageable in a large threaded opening on one end of said cap and which communicates with a small threaded opening extending through the opposite end of said cap, a conical recess between said large and small threaded openings, said recess tapering in a direction toward said large threaded opening so to form a constricting shoulder therebetween, a conical head of a needle removably seated in said recess when said needle extends out of said large diameter opening, said needle being externally threaded for subsequent engagement in said small thread opening, said small thread opening being closed by a membrane puncturable by said needle when removed from said recess and engaged in said small thread opening.

* * * * *